(12) United States Patent
Yu

(10) Patent No.: US 11,864,103 B2
(45) Date of Patent: Jan. 2, 2024

(54) NETWORK SLICING METHOD AND DEVICE, AND STORAGE MEDIUM

(71) Applicant: SHENZHEN AI-LINK CO., LTD., Guangdong (CN)

(72) Inventor: Yifan Yu, Guangdong (CN)

(73) Assignee: SHENZHEN AI-LINK CO., LTD., Guangdong (CN)

( * ) Notice: Subject to any disclaimer, the term of this patent is extended or adjusted under 35 U.S.C. 154(b) by 0 days.

(21) Appl. No.: 18/265,745

(22) PCT Filed: Mar. 24, 2022

(86) PCT No.: PCT/CN2022/082672
§ 371 (c)(1),
(2) Date: Jun. 7, 2023

(87) PCT Pub. No.: WO2022/257549
PCT Pub. Date: Dec. 15, 2022

(65) Prior Publication Data
US 2023/0397097 A1    Dec. 7, 2023

(30) Foreign Application Priority Data

Jun. 10, 2021  (CN) .......................... 202110645811.7

(51) Int. Cl.
*H04W 48/18* (2009.01)
*H04W 48/12* (2009.01)
*H04W 8/24* (2009.01)
*H04W 8/20* (2009.01)
*H04W 76/10* (2018.01)

(52) U.S. Cl.
CPC ............ *H04W 48/18* (2013.01); *H04W 8/20* (2013.01); *H04W 8/24* (2013.01); *H04W 48/12* (2013.01); *H04W 76/10* (2018.02)

(58) Field of Classification Search
None
See application file for complete search history.

(56) References Cited

U.S. PATENT DOCUMENTS

| 2011/0296042 A1 | 12/2011 | Li et al. |
| 2019/0166467 A1 | 5/2019 | Livanos et al. |
| 2020/0389843 A1* | 12/2020 | Huang .................. H04W 8/08 |

FOREIGN PATENT DOCUMENTS

| CN | 108232345 A | 6/2018 |
| CN | 108628864 A | 10/2018 |
| (Continued) |

OTHER PUBLICATIONS

China National Intellectual Property Administration, International Search Report, Application No. PCT/CN2022/082672, dated Apr. 26, 2022, 3 pages, English Translation, 2 pages.

(Continued)

*Primary Examiner* — Gary Lafontant
(74) *Attorney, Agent, or Firm* — Ziegler IP Law Group, LLC

(57) ABSTRACT

Provided are a network slicing method and device, and a storage medium. The method includes: a terminal sending a target protocol data unit (PDU) session establishment request to a local SMF, wherein the PDU session establishment request includes terminal identification information, the PDU session establishment request is forwarded by the local SMF to a local UDM to request a user subscription, the local UDM acquires, according to the terminal identification information, target network slice information corresponding to the terminal identification information and notifies the local SMF, then the local SMF replaces initial network slice information with the target network slice information and determines to establish a PDU session; and the terminal receiving a bearer establishment notification sent by a base station according to an instruction of a local AMF for establishing a radio bearer, wherein the bearer establishment notification is used for instructing the terminal to establish a radio bearer.

8 Claims, 6 Drawing Sheets

(56) References Cited

FOREIGN PATENT DOCUMENTS

| CN | 110661630 A | 1/2020 |
|---|---|---|
| CN | 110933711 A | 3/2020 |
| CN | 111247771 A | 6/2020 |
| CN | 111436160 A | 7/2020 |
| CN | 112672370 A | 4/2021 |
| CN | 112672372 A | 4/2021 |
| CN | 113098726 A | 7/2021 |
| WO | 2019057015 A1 | 3/2019 |

OTHER PUBLICATIONS

China National Intellectual Property Administration, Written Opinion of the International Searching Authority, Application No. PCT/CN2022/082672, dated Apr. 26, 2022, 4 pages, English Translation, 6 pages.

The State Intellectual Property Office of People's Republic of China, First Office Action, Application No. 2021106458117, dated Jul. 20, 2021, 3 pages, English Translation, 5 pages.

The State Intellectual Property Office of People's Republic of China, Notification to Grant Patent Right for Invention, Application 202110645811.7, dated Aug. 12, 2021, 1 page, English Translation, 2 pages.

The State Intellectual Property Office of People's Republic of China, Supplementay Search, Application No. 202110645811.7, dated Aug. 11, 2021, 1 page.

The State Intellecutal Property of People's Republic of China, First Search, Application No. 2021106458117 dated Jul. 13, 2021, 2 pages.

\* cited by examiner

NETWORK SLICING METHOD AND DEVICE, AND STORAGE MEDIUM

CROSS-REFERENCE TO RELATED APPLICATION

The present application claims priority to Chinese Patent Application No. 202110645811.7 filed to China National Intellectual Property Administration on Jun. 10, 2021 and entitled "NETWORK SLICING METHOD AND DEVICE, AND STORAGE MEDIUM", which is hereby incorporated by reference in its entirety.

TECHNICAL FIELD

The present application relates to the technical field of communications, and in particular, to a network slicing method, a network slicing device, and a storage medium.

BACKGROUND

The 5th generation mobile network (5G) local network is also referred to as a private 5G network, which uses a 5G technology to create a dedicated network on the local user site, where the dedicated network has uniform connectivity, optimized service, and a secure communication mode in a specific area, and provides characteristics of high transmission speed, low latency, and mass connection supported by the 5G technology. In an Industrial Internet of Things (IIoT) scenario, sensors may be installed in a factory to monitor environmental conditions, support quality control and custom manufacturing, and the like. Through the 5G local network, the data of the sensors can be collected and analyzed, so as to master information in all aspects of factory operation in a refined mode. Furthermore, the 5G local network can transmit the analysis result to an intelligent robot and the like, so as to support product manufacturing or factory goods transportation. With the 5G local network, a worker can wear a lightweight augmented reality device, and accomplish a device operation through a virtual environment.

Currently, there are many campuses, corporate buildings or public places where the 5G local network can be deployed. In these places, a 5G network slice can be used to cut a 5G physical network into a plurality of virtual networks, performing differentiated management on 5G network data, keeping logic independence among the virtual networks, and providing customized network services for different terminal users based on not additionally arranging a network architecture.

However, the customization manner between a terminal and a network slice in the prior art is complex and thus difficult to implement.

SUMMARY

In view of the above defects in the prior art, an objective of the present application is to provide a network slicing method, a network slicing device, and a storage medium, so as to solve the problem in the prior art that the customization manner between a terminal and a network slice is complex and thus difficult to implement.

To achieve the foregoing objective, the following technical solutions are used in embodiments of the present application.

According to a first aspect, an embodiment of the present application provides a network slicing method, including:

sending, by a terminal, a target protocol data unit (PDU) session establishment request to a local SMF, wherein the PDU session establishment request includes: initial network slice information, DNN information, terminal identification information, and PDU session identification information, the PDU session establishment request is forwarded to a local UDM by the local SMF, so as to request a user subscription, the local UDM obtains, according to the terminal identification information, target network slice information corresponding to the terminal identification information and notifies the local SMF, and then the local SMF replaces the initial network slice information with the target network slice information and determines to establish a PDU session; and receiving, by the terminal, a bearer establishment notification sent by a base station according to an indication of a local AMF to establish a radio bearer, wherein the bearer establishment notification is used to indicate the terminal to establish the radio bearer, and wherein the local AMF indicates the base station to establish the radio bearer after the local SMF indicates to confirm establishment of the PDU session.

According to a second aspect, another embodiment of the present application provides a network slicing method, including:

receiving, by a local UDM, a subscription request sent by a local SMF according to a PDU session establishment request initiated by a terminal, wherein the PDU session establishment request includes: initial network slice information, DNN information, terminal identification information, and PDU session identification information, and the subscription request includes: the terminal identification information;

obtaining, by the local UDM, target network slice information corresponding to the terminal identification information according to the terminal identification information; and sending, by the local UDM, subscription information to a local SMF, wherein the subscription information includes: the target network slice information, so that the local SMF replaces the initial network slice information in the PDU session establishment request with the target network slice information and determines to establish a PDU session.

According to a third aspect, another embodiment of the present application provides a network slicing apparatus, including:

receiving, by a local SMF, a PDU session establishment request sent by a terminal, wherein the PDU session establishment request includes: initial network slice information, DNN information, terminal identification information, and PDU session identification information;

sending, by the local SMF, a subscription request to local UDM according to the PDU session establishment request, wherein the subscription request includes: terminal identification information of the terminal;

receiving, by the local SMF, subscription information sent by the local UDM, wherein the subscription information includes target network slice information corresponding to the terminal identification information; and the local SMF replacing the initial network slice information in the PDU session establishment request with the target network slice information and determining to establish a PDU session.

According to a fourth aspect, another embodiment of the present application provides a network slicing apparatus, including: a sending module and an establishment module, wherein:

the sending module is configured to send, by a terminal, a target protocol data unit (PDU) session establishment request to a local SMF, wherein the PDU session establishment request includes: initial network slice information, DNN information, terminal identification information, and PDU session identification information, the PDU session establishment request is forwarded to a local UDM by the local SMF, so as to request a user subscription, the local UDM obtains, according to the terminal identification information, target network slice information corresponding to the terminal identification information and notifies the local SMF, and then the local SMF replaces the initial network slice information with the target network slice information and determines to establish a PDU session; and the establishment module is configured to receive, by the terminal, a bearer establishment notification sent by a base station according to an indication of a local AMF to establish a radio bearer, wherein the bearer establishment notification is used to indicate the terminal to establish the radio bearer, and wherein the local AMF indicates the base station to establish the radio bearer after the local SMF indicates to confirm establishment of the PDU session.

According to a fifth aspect, another embodiment of the present application provides a network slicing apparatus, including: a receiving module, an obtaining module, and a sending module, wherein:

the receiving module is configured to receive, by a local UDM, a subscription request sent by a local SMF according to a PDU session establishment request initiated by a terminal, wherein the PDU session establishment request includes: initial network slice information, DNN information, terminal identification information, and PDU session identification information, and the subscription request includes: the terminal identification information;

the obtaining module is configured to obtain, by the local UDM, target network slice information corresponding to the terminal identification information according to the terminal identification information; and the sending module is configured to send, by the local UDM, subscription information to the local SMF, wherein the subscription information includes: the target network slice information, so that the local SMF replaces the initial network slice information in the PDU session establishment request with the target network slice information and determines to establish a PDU session.

According to a sixth aspect, another embodiment of the present application provides a network slicing apparatus, including: a receiving module, a sending module, and a replacement module, wherein:

the receiving module is configured to receive, by a local SMF, a PDU session establishment request sent by a terminal, wherein the PDU session establishment request includes: initial network slice information, DNN information, terminal identification information, and PDU session identification information;

the sending module is configured to send, by the local SMF, a subscription request to local UDM according to the PDU session establishment request, wherein the subscription request includes: terminal identification information of the terminal;

the receiving module is specifically configured to receive, by the local SMF, subscription information sent by the local UDM, wherein the subscription information includes target network slice information corresponding to the terminal identification information; and the replacement module is configured to replace the initial network slice information in the PDU session establishment request with the target network slice information and determine to establish a PDU session by the local SMF.

The receiving module is specifically configured to receive, by the SMF, update information sent by the UDM, wherein the update information includes: an updated mapping relationship between the terminal identification information and the target network slice information; and the sending module is specifically configured to send the update information to an AMF by the SMF, so that the AMF is configured to send the update information to the base station and send a resource modification instruction to the terminal.

According to a seventh aspect, another embodiment of the present application further provides a network slicing device, including: a processor, a storage medium, and a bus, wherein the storage medium has machine-readable instructions stored thereon and executable by the processor, when the network slicing device is running, the processor and the storage medium communicate via the bus, and the processor executes the machine-readable instructions to perform the steps of the method according to any one of the first aspect to the third aspect.

According to an eighth aspect, another embodiment of the present application provides a storage medium, wherein the storage medium has a computer program stored thereon, and the computer program, when executed by a processor, performs the steps of the method according to any one of the first aspect to the third aspect.

The beneficial effects of the present application are as follows: by using the network slicing method provided in the present application, since slicing information is set by UDM itself, for the slicing information, corresponding network slicing information can be set by a network manager itself at a network side. In a network slicing process, after receiving a PDU session establishment request including terminal identification information sent by a terminal, the SMF can forward the PDU session establishment request to the UDM, so as to request a user subscription. The UDM obtains, according to the terminal identification information, target network slice information corresponding to the terminal identification information, and then the SMF replaces, according to the received target network slice information, initial network slice information with the target network slice information and determines to establish a PDU session. Subsequently, the terminal receives an indication of the AMF to establish a radio bearer, thereby realizing a function of independently setting a network slice corresponding to each UE, which not only simplifies the customization of the network slices, but also enables a network user of the UE to support services with different QoS through the network slices in a 5G local network without replacing a dedicated 5G terminal. Therefore, a threshold for using 5G network slicing is significantly lowered, and the flexibility of a network user to manage a network slice is increased.

BRIEF DESCRIPTION OF THE DRAWINGS

In order to more clearly illustrate the technical solutions of embodiments of the present application, the drawings required in the embodiments will be briefly described below. It should be understood that the following drawings only illustrate some embodiments of the present application and therefore should not be considered as limitations of the scope, and for those of ordinary skill in the art, other related drawings can be obtained according to these drawings without creative efforts.

DETAILED DESCRIPTION OF THE EMBODIMENTS

Figure 1:
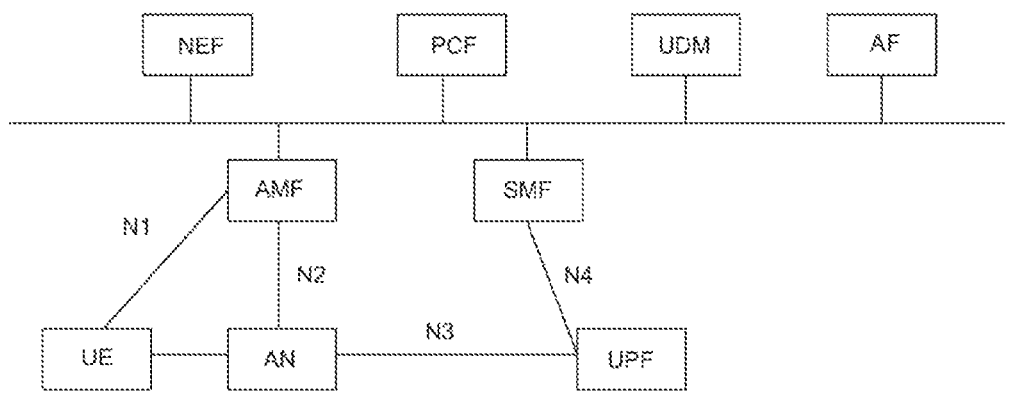
FIG. 1 is a schematic diagram of a network architecture suitable for a network slice establishment method according to an embodiment of the present application.

To make the objectives, technical solutions, and advantages of embodiments of the present application clearer, the following clearly and completely describes the technical solutions in embodiments of the present application with reference to the accompanying drawings in embodiments of the present application. It is clear that the described embodiments are merely some rather than all of embodiments of the present application.

The components of embodiments of the present application, as generally described and illustrated in the figures herein, can be arranged and designed in a wide variety of different configurations. Therefore, the following detailed description of embodiments of the present application provided in the accompanying drawings is not intended to limit the scope of the present application as claimed, but is merely representative of selected embodiments of the present application. Based on embodiments of the present application, all other embodiments obtained by those skilled in the art without making creative efforts shall fall within the protection scope of the present application.

It should be noted that similar reference numerals and letters indicate similar items in the following accompanying drawings, and therefore, once an item is defined in one of the accompanying drawings, no further definition or explanation is required in the following accompanying drawings.

At present, a customization manner between a terminal and a network slice is complex and thus difficult to realize, and management of network slices in a 5G local network by setting network slice information S-NSSAI is not supported in the prior art.

In view of this, an embodiment of the present application provides a network slicing method, wherein the method may be set, by a local UDM itself, corresponding network slice information according to terminal identification information of a user equipment (UE), so as to implement a function of independently setting a network slice corresponding to each UE, thereby not only simplifying customization of the network slice, but also enabling a network user of the UE to support services of different QoS through the network slices inside a 5G local network without replacing a dedicated 5G terminal. Therefore, a threshold for using 5G network slicing is significantly lowered, and the flexibility of a network user to manage a network slice is increased.

Before introducing the present application, an application scenario of embodiments of the present application is first described, the technical solutions of embodiments of the present application may be applied to various local network communication systems, for example, local scenarios such as campuses, corporate buildings or public places, and the 5G local network can be deployed in the above local scenarios. The local network elements mentioned in the present application are refer to network elements in the 5G local network, such as a local SMF, and other network elements are not described one by one. A 5G network slice can be used to cut a 5G physical network into a plurality of virtual networks, performing differentiated management on 5G network data, keeping logic independence among the virtual networks, and providing customized network services for different terminal users without additionally arranging a network architecture.

Further, the flowcharts used in the present application show operations implemented according to some embodiments of the present application. It should be understood that the operations in the flowcharts may be performed out of order, and that steps without logical context may be performed in reverse order or concurrently. In addition, those skilled in the art, with the guidance of the present application, may add one or more other operations to, or remove one or more operations from, the flowcharts.

FIG. 1 is a schematic diagram of a network architecture suitable for a network slice establishment method according to an embodiment of the present application. As shown in FIG. 1, the network architecture may specifically include the following network elements:

1. User equipment (UE): may also be referred to a user device, a terminal, an access terminal, a subscriber unit, a subscriber station, a mobile station, a remote station, a remote terminal, a mobile device, a user terminal, a wireless communication device, a user agent, or a user apparatus. The UE may also be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a user equipment in a 5G network, a user equipment in a future evolved public land mobile network (PLMN), or the like, and may also be an end device, a logic entity, an intelligent device, a user equipment such as a mobile phone or an intelligent terminal, or a communication device such as a server, a gateway, a base station, a controller, and the like, or an Internet of things (IoT) device such as a sensor, an electric meter, a water meter, and the like. This is not limited in embodiments of the present application.

2. Access network (AN): provides a network access function for authorized users in a specific area, and can use transmission tunnels with different qualities according to the level of the users, service requirements and the like. The access networks may be access networks using different access technologies. There are two types of current radio access technologies: a 3rd generation partnership project (3GPP) access technology (such as the radio access technologies used in 3G, 4G, or 5G systems) and non-3rd generation partnership project (non-3GPP) access technology. The 3GPP access technology refers to an access technology that conforms to 3GPP standard specifications, and an access network using the 3GPP access technology is referred to as a radio access network (RAN), wherein an access network device in a 5G system is referred to as a next generation node base station (gNB). The non-3GPP access technology refers to an access technology that does not conform to the 3GPP standard specifications, for example, an air interface technology represented by an access point (AP) in wifi.

An access network that implements an access network function based on a wireless communication technology may be referred to as a radio access network (RAN). The radio access network can manage radio resources, provide access service for a terminal, and further complete forwarding of control signals and user data between the terminal and a core network.

In the above, the access network device may include a device in the access network that communicates with the wireless terminals over the air-interface through one or more sectors. An access network system may be configured to perform mutual conversion on the received air frames and Internet protocol (IP) packets as routers between the wireless terminals and the rest of the access network, wherein the rest of the access network may include an IP network. The radio access network system may further coordinate attribute management for the air interface. It should be understood that access network devices include, but are not limited to: an evolved NodeB (eNB), a radio network controller (RNC), a node B (NB), a base station controller (BSC), a base transceiver station (BTS), a home base station (e.g., Home evolved NodeB, or Home NodeB, HNB), a base band unit (BBU), an access point (AP) in a wireless fidelity (WIFI) system, a wireless relay node, a wireless backhaul node, a transmission and reception point (TRP), a transmission point (TP), or the like, and may also be 5G, for example, NR, a gNB in a system, or a transmission point (TRP or TP), or one or a group of antenna panels (including a plurality of antenna panels) of a base station in a 5G system, or may further be a network node that forms a gNB or a transmission point, for example, a baseband unit (BBU), a distributed unit (distributed unit, DU), and the like.

3. Access and mobility management function (AMF) entity: is mainly configured for mobility management, access management, and the like, and may be configured to implement other functions, such as functions of lawful interception, or access authorization (or authentication), in addition to session management in mobility management entity (MME) functions. In embodiments of the present application, the AMF entity may be configured to implement the function of an access and mobility management network element.

4. Session management function (SMF) entity: is mainly configured for session management, Internet protocol (IP) address allocation and management of the UE, selection of a termination point of an interface capable of managing a user plane function, policy control or charging function, notification of downlink data, and the like. In embodiments of the present application, the SMF entity may be configured to implement the function of a session management network element.

5. User plane function (UPF) entity: i.e., a data plane gateway, may be configured for packet routing and forwarding, quality of service (QoS) processing of user plane data, or the like. The user data may be accessed to a data network (DN) through the network element. In embodiments of the present application, the UPF entity may be configured to implement the function of a user plane gateway.

6. Network exposure function (NEF) entity: is configured to securely open services, capabilities, and the like provided by the 3GPP network functions to the outside.

7. Network function (NF) repository function (NRF) entity: is configured to store the description information of the network function entity and the service provided by the network function entity, and support service discovery, network element entity discovery and the like.

8. Policy control function (PCF) entity: is a unified policy framework for guiding network behavior, providing policy rule information for control plane function network elements (e.g., AMF and SMF network elements), and the like.

9. Unified data management (UDM) entity: is configured for handling subscriber identity, access authentication, registration, mobility management, or the like.

10. Application function (AT) entity: is configured to perform data routing influenced by application, access to a network exposure function network element, perform policy control by interacting with a policy framework, or the like.

In the network architecture, an N1 interface is a reference point between a terminal and an AMF entity; an N2 interface is a reference point for an AN entity and an AMF entity, and is configured to send non-access stratum (NAS) messages and the like; an N3 interface is a reference point between the AN entity and an UPF entity, and is configured to transmit data of a user plane and the like; an N4 interface is a reference point between an SMF entity and the UPF entity, and is configured to transmit information such as tunnel identification information, data buffer indication information, and downlink data notification message of the N3 connection.

It should be understood that the network architecture applied to embodiments of the present application is only an example of a network architecture described from the perspective of a conventional point-to-point architecture and a service-oriented architecture, and a network architecture to which embodiments of the present application are applicable is not limited thereto, and any network architecture capable of implementing the functions of the above network elements is applicable to embodiments of the present application. It should be understood that the above network elements may communicate with each other through a preset interface. Details are not described herein again.

It should also be understood that the AMF entity, SMF entity, UPF entity, NEF entity, PCF entity, UDM entity shown in FIG. 1 may be understood as network elements in the core network for implementing different functions, for example, they may be combined into network slices as needed. These network elements of core network may be independent devices, or may be integrated into the same device to implement different functions. This is not limited in the present application.

Hereinafter, for convenience of description, an entity for implementing the AMF is denoted as an AMF, an entity for implementing the PCF is denoted as a PCF, and other denotations are similar. Details are not described herein. It should be understood that the foregoing names are only used to distinguish different functions, and do not represent that these network elements are independent physical devices. The specific form of the foregoing network elements are not limited in the present application, for example, these network elements may be integrated into the same physical device, or may be different physical devices. In addition, the foregoing names are only for convenience in distinguishing between different functions and should not be construed as limiting the present application in any way. The present application does not exclude the possibility of using other names in 5G networks and other networks in the future. For example, in a 6G network, some or all of the foregoing network elements may follow the terminology in 5G, and may also use other names. Unified descriptions are provided herein, and details are not described below again.

It should also be understood that the name of the interface between network elements in FIG. 1 is only an example, and the name of the interface in the specific implementation may be other names, which is not specifically limited in the present application. In addition, the name of the transmitted message (or signaling) between the network elements is only an example, which does not limit function of the message itself in any way.

Figure 2:
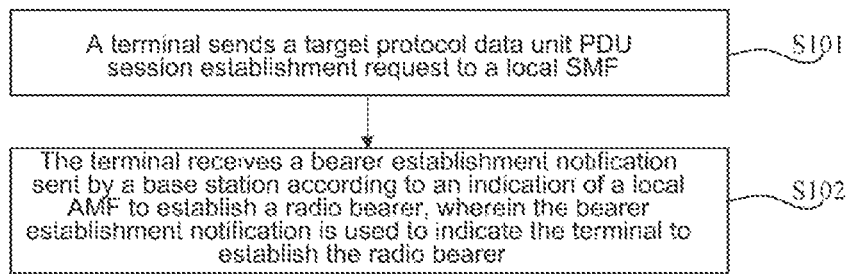
FIG. 2 is a schematic flowchart of a network slicing method according to an embodiment of the present application.

A network slicing method provided in embodiments of the present application is explained below with reference to a plurality of specific application examples. FIG. 2 is a schematic flowchart of a network slicing method according to an embodiment of the present application, wherein an execution body of the method may be a terminal, that is, may be a user equipment (UE) in FIG. 1, and as shown in FIG. 2, the method includes:

S101: The terminal sends a target protocol data unit PDU session establishment request to a local SMF.

The PDU session establishment request includes: initial network slice information, data network name (DNN) information, terminal identification information, and PDU session identification information. Herein, the PDU session establishment request is forwarded to local UDM by the local SMF, so as to request user subscription, the local UDM obtains, according to the terminal identification information, target network slice information corresponding to the terminal identification information and notifies the local SMF, and then the local SMF replaces the initial network slice information with the target network slice information and determines to establish a PDU session.

For example, in embodiments of the present application, a mapping relationship between the terminal identification information and the target network slice information may be pre-configured in the local UDM, for example, the mapping relationship is configured by a network manager through a NEF of a 5G local network, and the configuration information is written into the UDM before the terminal accesses the network, so that the local UDM may directly search, according to the terminal identification information, the target network slice information corresponding to the terminal identification information in the local record.

In an embodiment of the present application, the terminal identification information may be, for example, international mobile subscriber identity (IMSI) information, or international mobile equipment identity (IMEI) information, wherein the IMSI information is an identity that does not repeat in all cellular networks and is used to distinguish different users in the cellular networks. Of course, other identifiers such as user account may be used and are not limited herein.

Figure 3:
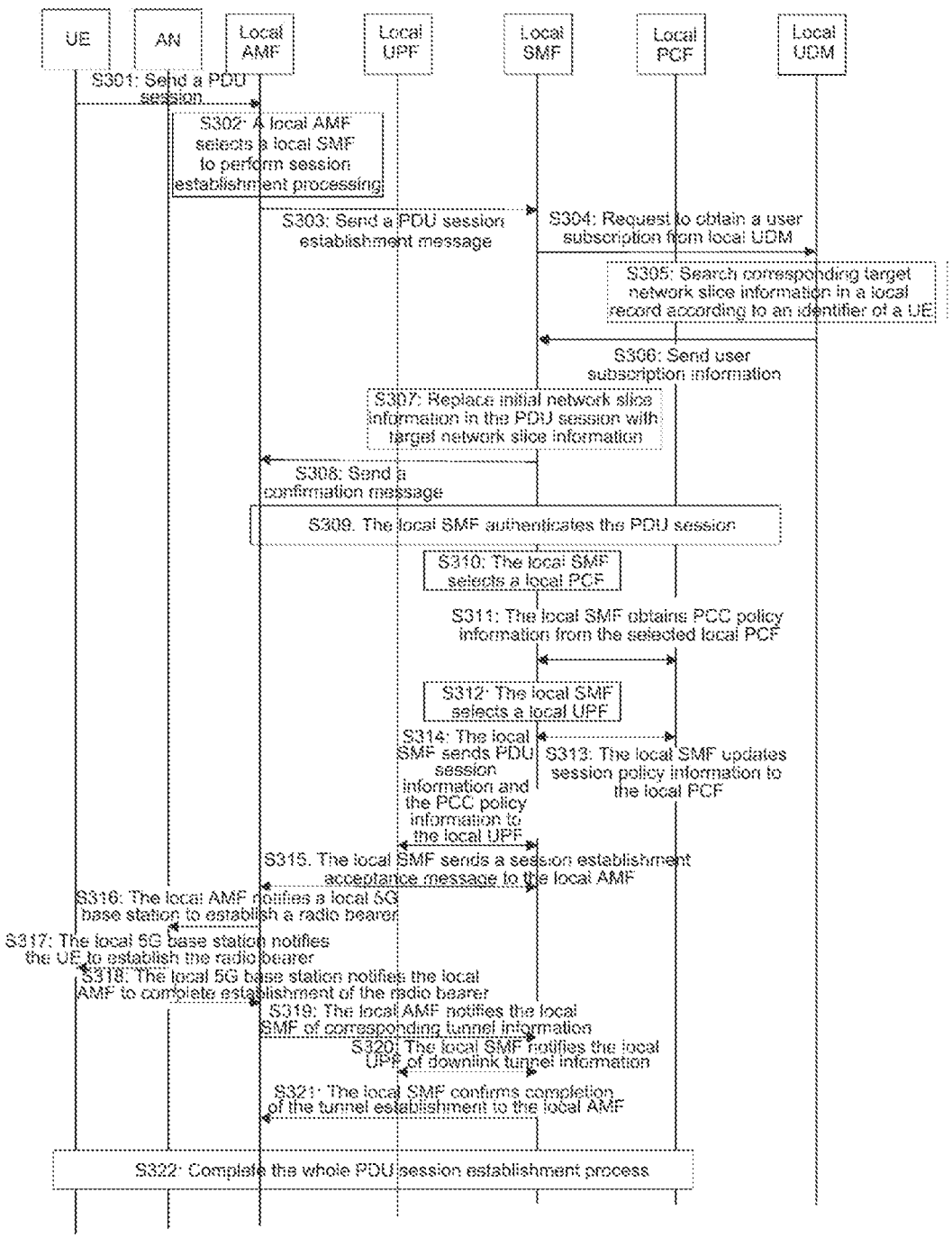
FIG. 3 is a schematic diagram of an interaction of a network slice establishing process according to an embodiment of the present application.

FIG. 3 is a schematic diagram of an interaction of a network slice establishing process according to an embodiment of the present application; in the following embodiments, an initial network slice request may be denoted as "S-NSSAI 1", and a target network slice request may be denoted as "S-NSSAI 2". As shown in FIG. 3, in an embodiment of the present application, a specific interaction process of sending a target protocol data unit (PDU) session establishment request to a local SMF by a terminal may include, for example:

S301: Send a PDU session.

Herein, the PDU session in S301 is sent by a terminal UE to a local AMF, and the PDU includes: initial network slice information S-NSSAI 1, DNN information, terminal identification information, and PDU session identification information.

S302: The local AMF selects a local SMF to perform session establishment processing. That is, the local SMF is determined.

S303: Send a PDU session establishment message.

Herein, the session establishment message in S303 is sent by the local AMF to the local SMF, and the session establishment message is a PDU session establishment message including an identifier of the UE.

S304: Request to obtain a user subscription from the local UDM.

In S304, the PDU session establishment message is received by the local SMF, and then the local SMF requests to obtain the user subscription from the local UDM, and notifies the local UDM of the identifier of the UE.

S305: Search corresponding target network slice information in the local record according to the identifier of the UE.

In S305, the local UDM searches in the local record according to the identifier of the UE, and retrieves the target network slice information S-NSSAI 2 corresponding to the identifier of the UE.

S306: Send user subscription information.

In S306, the local UDM sends the user subscription information including the target network slice information S-NSSAI 2 to the local SMF.

S307: Replace the initial network slice information in the PDU session with the target network slice information.

In S307, the local SMF replaces the initial network slice information S-NSSAI 1 in the PDU session context information with the target network slice information S-NSSAI 2 according to the received user subscription information.

S308: Send a confirmation message.

Herein, the confirmation message in S308 is a confirmation message that is sent by the local SMF to the local AMF and includes the target network slice information S-NSSAI 2, wherein the confirmation message is used to confirm that the PDU session may be established.

Further, with reference to FIG. 2:

S102: The terminal receives a bearer establishment notification sent by a base station according to an indication of a local AMF to establish a radio bearer, wherein the bearer establishment notification is used to indicate the terminal to establish the radio bearer.

Herein, the local AMF indicates the base station to establish the radio bearer after the local SMF indicates to confirm establishment of the PDU session.

Optionally, continuing as shown in FIG. 3, the specific process of establishing the radio bearer by the terminal may be:

S309: The local SMF authenticates the PDU session.
S310: The local SMF selects a local PCF.
S311: The local SMF requests to obtain PCC policy information from the selected local PCF.
S312: The local SMF selects a local UPF.
S313: The local SMF updates session policy information to the local PCF.
S314: The local SMF sends PDU session information and the PCC policy information to the local UPF.
S315: The local SMF sends a session establishment acceptance message to the local AMF.
S316: The local AMF notifies a local 5G base station (AN) to establish a radio bearer.
S317: The local 5G base station notifies the UE to establish the radio bearer.
S318: The local 5G base station notifies the local AMF to complete establishment of the radio bearer.
S319: The local AMF notifies the local SMF of corresponding tunnel information.
S320: The local SMF notifies the local UPF of downlink tunnel information.
S321: The local SMF confirms completion of the tunnel establishment to the local AMF.
S322: Complete the whole PDU session establishment process.

Based on the foregoing description, it can be seen that after the terminal initiates a PDU session establishment request and sends a PDU session to the local SMF, the local UDM receives the user subscription request information from the local SMF, then reads a terminal identifier therein, determines the target network slice information corresponding to the terminal identifier according to a preset mapping relationship between the terminal identifier and the UDM, and returns the obtained target network slice information to the SMF. By the method, the target network slice information corresponding to each terminal can be customized, so that the flexibility of the network slice information is increased, and the network slice information can be customized according to a user requirement.

With the network slicing method provided in the present application, since slicing information is set by UDM itself, that is, for the slicing information, corresponding network slicing information can be set by a network manager itself at a network side. In a network slicing process, after receiving a PDU session establishment request including terminal identification information sent by a terminal, the SMF can forward the PDU session establishment request to the UDM, so as to request user subscription, the UDM obtains, according to the terminal identification information, target network slice information corresponding to the terminal identification information, and then the SMF replaces, according to the received target network slice information, initial network slice information with the target network slice information and determines to establish a PDU session. Subsequently, the terminal receives an indication of the AMF to establish a radio bearer, thereby realizing a function of independently setting a network slice corresponding to each UE, which not only simplifies the customization of the network slices, but also enables a network user of the UE to support services with different QoS through the network slices in a 5G local network without replacing a dedicated 5G terminal. Therefore, a threshold for using 5G network slicing is significantly lowered, and the flexibility of a network user to manage a network slice is increased.

Figure 4:
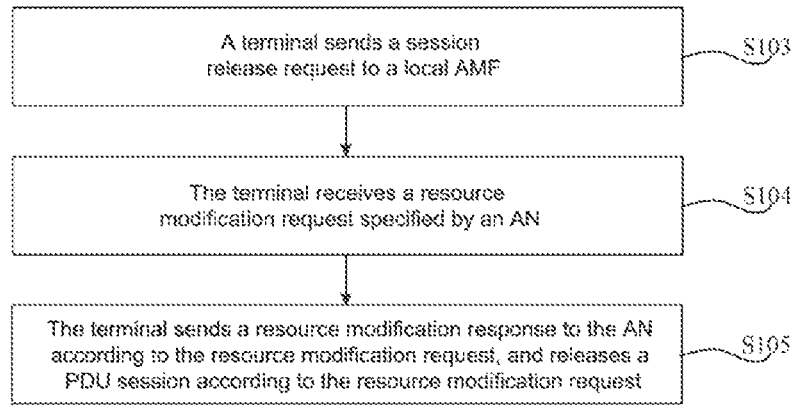
FIG. 4 is a schematic flowchart of a network slicing method according to another embodiment of the present application.

Optionally, based on the foregoing embodiments, embodiments of the present application may further provide a network slicing method, and an implementation process of the foregoing method is described as follows with reference to the accompanying drawings. FIG. 4 is a schematic flowchart of a network slicing method according to another embodiment of the present application, wherein after the PDU session is established, the previously established session may also be released, and as shown in FIG. 4, the method may further include:

S103: The terminal sends a session release request to the local AMF.

The session release request is used to indicate the AMF to send, after receiving a session release response sent by the local SMF, a resource release request to an access network AN.

S104: The terminal receives a resource modification request specified by the AN.
S105: The terminal sends a resource modification response to the AN according to the resource modification request, and releases the PDU session according to the resource modification request.

Figure 5:
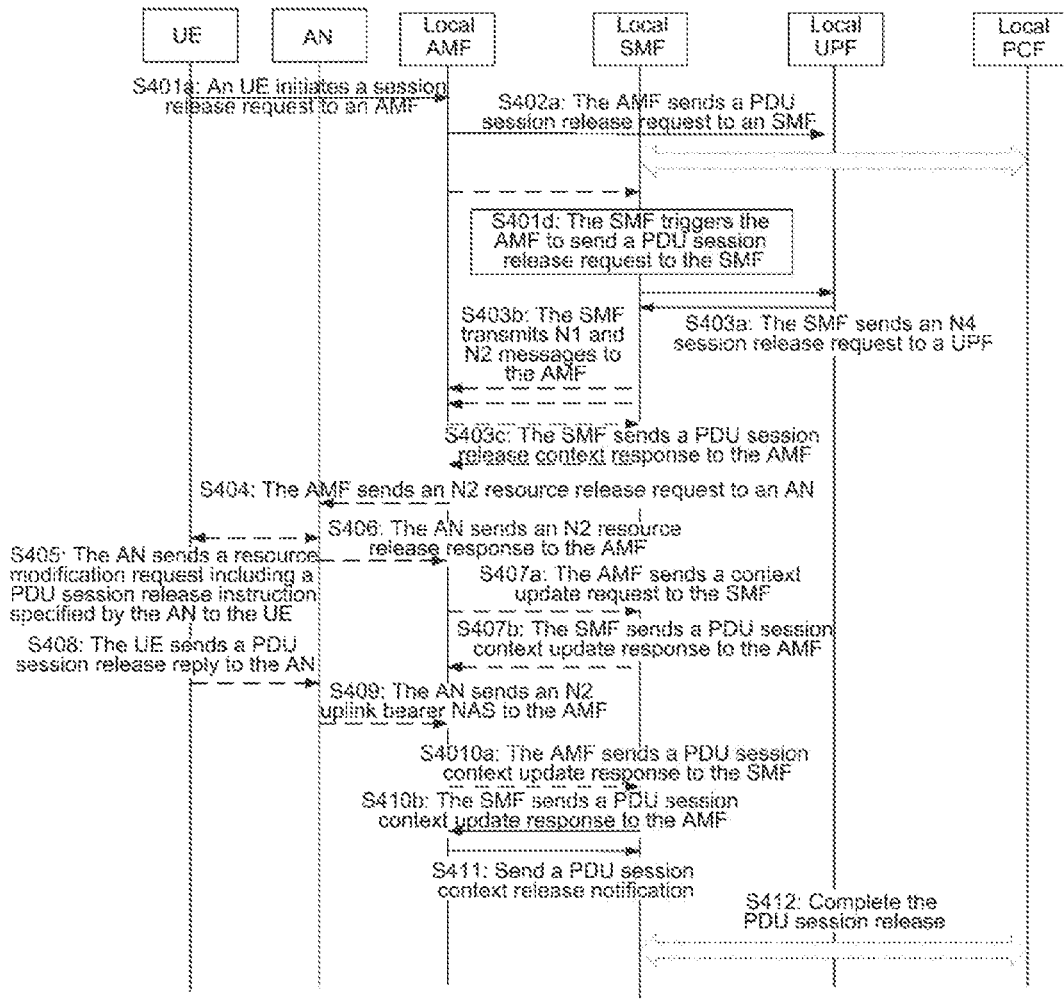
FIG. 5 is a schematic diagram of an interaction of a network slice closing process according to an embodiment of the present application.

FIG. 5 is a schematic diagram of an interaction of a network slice closing process according to an embodiment of the present application, wherein the network slice closing is PDU session release. As shown in FIG. 5, in an embodiment of the present application, the closing of a network slice may correspond to different trigger scenarios, for example, they may be initiated by a UE, may be triggered by an SMF, may also be initiated by an AMF, or initiated by an AMF triggered by an SMF, wherein the following 1a to 1d correspond to different session release trigger scenarios. In an embodiment of the present application, a corresponds to a session release trigger scenario initiated by the UE, b corresponds to a session release trigger scenario initiated by the SMF, c corresponds to a session release trigger scenario initiated by the AMF, and d corresponds to a session release trigger scenario initiated by the AMF triggered by the SMF, and wherein the closing process of the network slice specifically may include:

S401a: The UE initiates a session release request to the AMF.
S402a: The AMF sends a PDU session release request to the SMF.
S401d: The SMF triggers the AMF to send a PDU session release request to the SMF.
S403a: The SMF sends an N4 session release request to a UPF.

S403b: The SMF transmits N1 and N2 messages to the AMF.

S403c: The SMF sends a PDU session release context response to the AMF.

S404: The AMF sends an N2 resource release request to an AN.

S405: The AN sends a resource modification request that includes a PDU session release instruction and is specified by the AN to the UE.

S406: The AN sends an N2 resource release reply to the AMF.

S407a: The AMF sends a context update request to the SMF.

Herein, the context update request includes N2 and SM resource release reply, and a PDU session context update request of a user location.

S407b: The SMF sends a PDU session context update response to the AMF.

S408: The UE sends a PDU session release reply to the AN.

S409: The AN sends an N2 uplink bearer NAS to the AMF.

S410a: The AMF sends a PDU session context update response to the SMF.

Herein, the PDU session context update response includes a PDU session release reply and a user position.

S410b: The SMF sends a PDU session context update response to the AMF.

S411: Send a PDU session context release notification.

S412: Complete the PDU session release.

Figure 6:
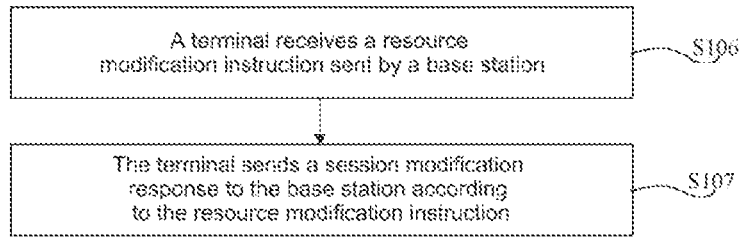
FIG. 6 is a schematic flowchart of a network slicing method according to another embodiment of the present application.

Optionally, based on the foregoing embodiments, embodiments of the present application may further provide a network slicing method, and an implementation process of the foregoing method is described as follows with reference to the accompanying drawings. FIG. 6 is a schematic flowchart of a network slicing method according to another embodiment of the present application, and as shown in FIG. 6, the method may further include:

S106: A terminal receives a resource modification instruction sent by a base station.

The resource modification instruction includes a PDU session modification request, the resource modification instruction is sent according to update information indicated by the SMF that has received update information sent by the UDM, and the update information is used to indicate the mapping relationship between the terminal identification information and the target network slice information to be updated.

S107: The terminal sends a session modification response to the base station according to the resource modification instruction.

Figure 7:
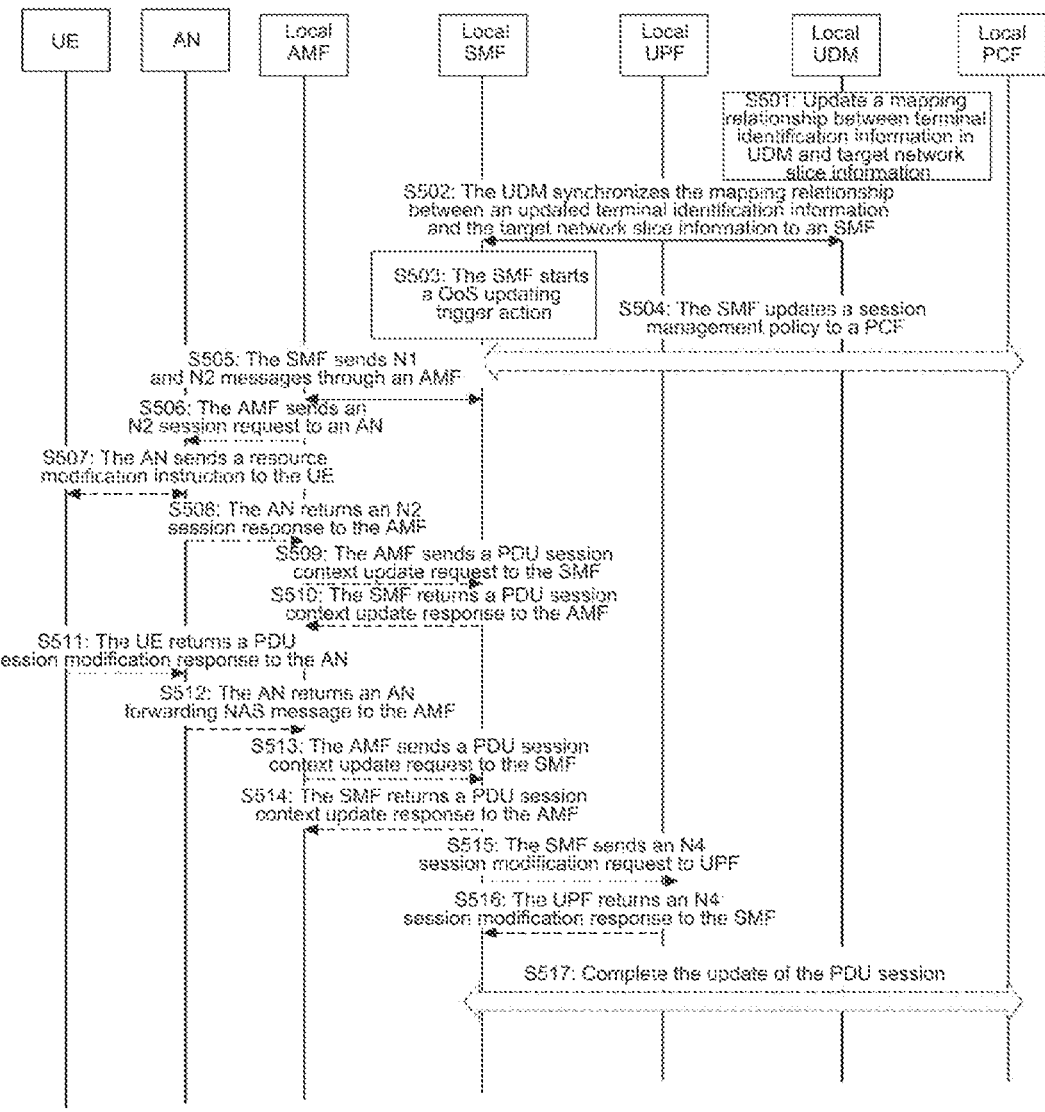
FIG. 7 is a schematic diagram of an interaction of a network slice update process according to an embodiment of the present application.

FIG. 7 is a schematic diagram of an interaction of a network slice update process according to an embodiment of the present application, wherein update of a network slice is modification of a PDU session, and update of the network slice is triggered by an update behavior of a mapping relationship between a terminal identifier in UDM and target network slice information. As shown in FIG. 7, in an embodiment of the present application, an interaction process of the network slice update process specifically are as follows:

S501: Update the mapping relationship between the terminal identification information in the UDM and the target network slice information.

S502: The UDM synchronizes the mapping relationship between the updated terminal identification information and the target network slice information to an SMF.

S503: The SMF starts a QoS updating trigger action.

S504: The SMF updates a session management policy to a PCF.

S505: The SMF sends N1 and N2 messages through an AMF.

Herein, the SMF transmits N1 and N2 information to the AMF, to notify the SMF of the updated session policy.

S506: The AMF sends an N2 session request to an AN.

S507: The AN sends a resource modification instruction to the UE.

Herein, the resource modification instruction includes a resource modification instruction of a PDU session modification request.

S508: The AN returns an N2 session response to the AMF.

S509: The AMF sends a PDU session context update request to the SMF.

S510: The SMF returns a PDU session context update response to the AMF.

S511: The UE returns a PDU session modification response to the AN.

S512: The AN returns an AN forwarding NAS message to the AMF.

S513: The AMF sends a PDU session context update request to the SMF.

S514: The SMF returns a PDU session context update response to the AMF.

S515: The SMF sends an N4 session modification request to UPF.

S516: The UPF returns an N4 session modification response to the SMF.

S517: Complete the update of the PDU session.

It can be seen that in embodiments of the present application, after the UE establishes the PDU session, the mapping relationship between the UE identifier and the target network slice information may be dynamically updated in the UDM. After the mapping relationship in the UDM is updated, the UDM notifies the local SMF of the dynamically updated mapping relationship between the UE identifier and the target network slicing information. The local SMF completes the PDU session modification process according to the updated mapping relationship between the UE identification and the target network slice information.

By using the network slicing method provided in the present application, a 5G terminal can send a PDU session establishment request including the terminal identification information to the local AMF, and the request is forwarded to the local SMF by the local AMF. Then, the local SMF sends a terminal subscription information request Subscription retrieve including terminal identification information to the local UDM, and the UDM inquires a local record according to the terminal identification information, obtains target network slice information S-NSSAI-2 corresponding to the identification, and returns the target network slice information to the local SMF. Next, the local SMF replaces the initial network slice information S-NSSAI-1 carried in the PDU session establishment request with target network slice information S-NSSAI-2 returned by the UDM, uses new network slice information S-NSSAI-2 as a target network slice of the terminal, completes interaction with other network elements in the 5G local network according to a 3GPP standard process, and returns a confirmation message confirming the establishment of the PDU session establishment request to the local AMF. After receiving the message, the local AMF interacts with the 5G base station and other network elements in the 5G local network according to a 3GPP standard process, and finally enables the 5G terminal to complete data connection and establishment of associated network slices in the 5G local network. This method can execute the operations of establishing, modifying and closing of the 5G network slice according to the identification information of the mobile terminal under the condition of connecting 5 base stations. In addition, this method can support the existing 5G terminal to establish a target network slice in the 5G local network under the condition of keeping initial network slice information, and the target network slice information can be set independently by a network manager at a network side. This method enables the network user to support, in the 5G local network, services with different QoS through network slicing, without replacing a special 5G terminal. Therefore, a threshold for using 5G network slicing is significantly lowered, and the flexibility of a network user to manage a network slice is increased.

Figure 8:
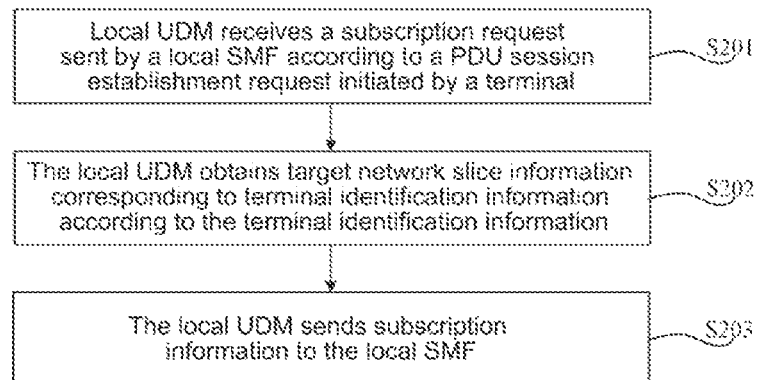
FIG. 8 is a schematic flowchart of a network slicing method according to another embodiment of the present application.

A network slicing method provided in embodiments of the present application is explained below with reference to a plurality of specific application examples. FIG. 8 is a schematic flowchart of a network slicing method according to an embodiment of the present application, wherein an execution body of the method may be the local UDM in FIG. 1, and as shown in FIG. 8, the method includes:

S201: Local UDM receives a subscription request sent by a local SMF according to a PDU session establishment request initiated by a terminal.

The PDU session establishment request includes: initial network slice information, DNN information, terminal identification information, and PDU session identification information; and the subscription request includes: terminal identification information;

S202: The local UDM obtains target network slice information corresponding to the terminal identification information according to the terminal identification information.

S203: The local UDM sends subscription information to the local SMF.

The subscription information may include: the target network slice information, so that the local SMF replaces the initial network slice information in the PDU session establishment request with the target network slice information and determines to establish a PDU session.

The foregoing method is the same as the method shown in FIG. 2, and the only difference is the execution body, so that the beneficial effects are the same. Details are not described in the present application again. In addition, the specific interaction diagram of the foregoing method is the same as the interaction diagram illustrated in FIG. 3.

Figure 9:
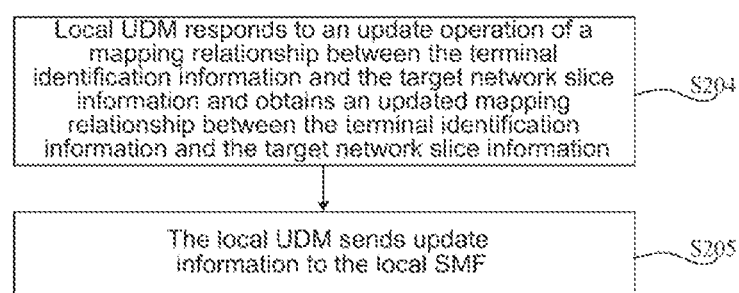
FIG. 9 is a schematic flowchart of a network slicing method according to another embodiment of the present application.

Optionally, based on the foregoing embodiments, embodiments of the present application may further provide a network slicing method, and an implementation process of the foregoing method is described as follows with reference to the accompanying drawings. FIG. 9 is a schematic flowchart of a network slicing method according to another embodiment of the present application, and as shown in FIG. 9, the method may further include:

S204: The local UDM obtains, in response to an update operation of a mapping relationship between the terminal identification information and the target network slice information, an updated mapping relationship between the terminal identification information and the target network slice information.

Optionally, mapping relationship between the terminal identification information and the target network slice information may be updated by an engineer, or the mapping relationship between the terminal identification information and the target network slice information may be updated by sending an update instruction to the local UDM through another device, which is not limited herein.

S205: The local UDM sends update information to the local SMF.

The update information includes: the updated mapping relationship between the terminal identification information and the target network slice information, so that the local SMF indicates the terminal to perform resource modification according to the update information.

Herein, the specific interaction diagram of the foregoing method is the same as that given in FIG. 7. Details are not described in the present application again.

In addition, the local UDM also participates in the release of the network slice, and a specific interaction diagram corresponding to the release process is the same as that given in FIG. 5. Details are not described in the present application again.

Figure 10:
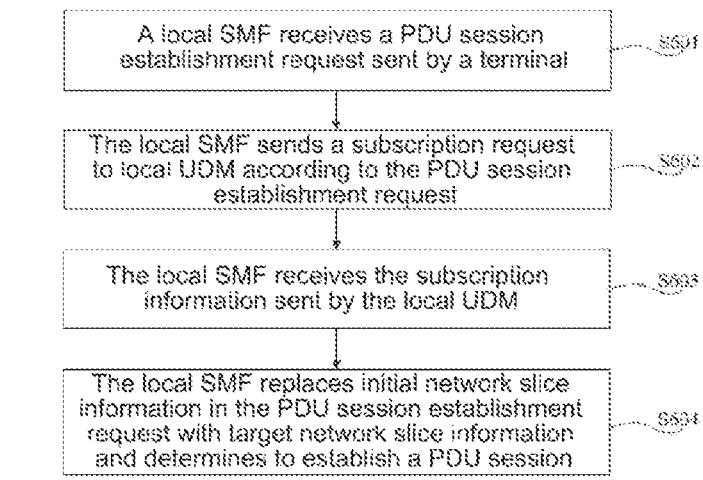
FIG. 10 is a schematic flowchart of a network slicing method according to another embodiment of the present application.

A network slicing method provided in embodiments of the present application is explained below with reference to a plurality of specific application examples. FIG. 10 is a schematic flowchart of a network slicing method according to an embodiment of the present application, wherein an execution body of the method may be the local SMF in FIG. 1, and as shown in FIG. 10, the method includes:

S601: The local SMF receives a PDU session establishment request sent by a terminal.

Herein, the PDU session establishment request includes: initial network slice information, DNN information, terminal identification information, and PDU session identification information;

S602: The local SMF sends a subscription request to the local UDM according to the PDU session establishment request.

Herein, the subscription request includes: terminal identification information of the terminal;

S603: The local SMF receives the subscription information sent by the local UDM.

The subscription information includes target network slice information corresponding to the terminal identification information;

S604: The local SMF replaces the initial network slice information in the PDU session establishment request with the target network slice information and determines to establish a PDU session.

The foregoing embodiment is the same as the method given in FIG. 2, and the only difference is the execution body, so that the beneficial effects are the same. Details are not described in the present application again. In addition, the specific interaction diagram of the foregoing method is the same as the interaction diagram illustrated in FIG. 3.

Figure 11:
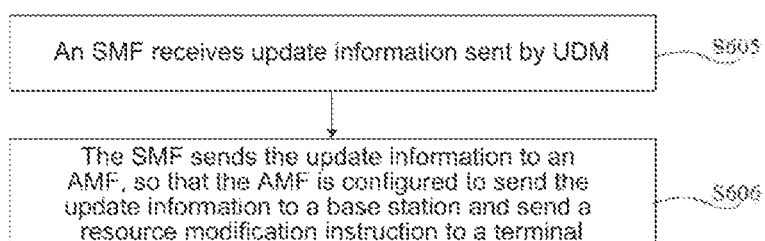
FIG. 11 is a schematic flowchart of a network slicing method according to another embodiment of the present application.

Optionally, based on the foregoing embodiments, embodiments of the present application may further provide a network slicing method, and an implementation process of the foregoing method is described as follows with reference to the accompanying drawings. FIG. 11 is a schematic flowchart of a network slicing method according to another embodiment of the present application, and as shown in FIG. 11, the method may further include:

S605: The SMF receives update information sent by the UDM.

Herein, the update information includes: the updated mapping relationship between the terminal identification information and the target network slice information.

S606: The SMF sends the update information to the AMF, so that the AMF is configured to send the update information to a base station and send a resource modification instruction to the terminal.

Herein, the specific interaction diagram of the foregoing method is the same as that given in FIG. 7. Details are not described in the present application again.

In addition, the SMF also participates in the release of the network slice, and a specific interaction diagram corresponding to the release process is the same as that given in FIG. 5. Details are not described in the present application again.

The network slicing apparatus provided in the present application is explained with reference to the accompanying drawings below, and the network slicing apparatus can execute any one of the network slicing methods in FIGS. 1 to 7. For specific implementation and beneficial effects, reference is made to the above descriptions, and details are not described below.

Figure 12:
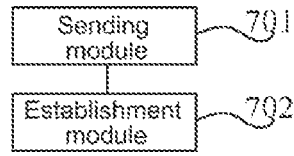
FIG. 12 is a schematic diagram of a structure of a network slicing apparatus according to an embodiment of the present application.

FIG. 12 is a schematic diagram of a structure of a network slicing apparatus according to an embodiment of the present application, and as shown in FIG. 12, the apparatus includes: a sending module 701 and an establishment module 702, wherein:

the sending module 701 is configured to send, by a terminal, a target protocol data unit PDU session establishment request to a local SMF, wherein the PDU session establishment request includes: initial network slice information, DNN information, terminal identification information, and PDU session identification information, the PDU session establishment request is forwarded to local UDM by the local SMF, so as to request user subscription, the local UDM obtains, according to the terminal identification information, target network slice information corresponding to the terminal identification information and notifies the local SMF, and then the local SMF replaces the initial network slice information with the target network slice information and determines to establish a PDU session; and the establishment module 702 is configured to receive, by the terminal, a bearer establishment notification sent by a base station according to an indication of a local AMF to establish a radio bearer, wherein the bearer establishment notification is used to indicate the terminal to establish the radio bearer, and wherein the local AMF indicates the base station to establish the radio bearer after the local SMF indicates to confirm establishment of the PDU session.

Optionally, a mapping relationship of the terminal identification information and the target network slice information is pre-configured within the local UDM.

Figure 13:
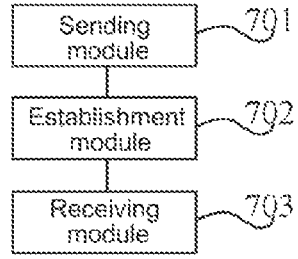
FIG. 13 is a schematic diagram of a structure of a network slicing apparatus according to another embodiment of the present application.

Optionally, based on the foregoing embodiments, embodiments of the present application may further provide a camera aperture control apparatus, and an implementation process of the apparatus given in FIG. 12 is described as follows with reference to the accompanying drawings. FIG. 13 is a schematic diagram of a structure of a network slicing apparatus according to another embodiment of the present application, and as shown in FIG. 13, the apparatus further includes: a receiving module 703, wherein:

the sending module 701 is specifically configured to send, by a terminal, a session release request to a local AMF, wherein the session release request is used to indicate the AMF to send, after receiving a session release response sent by the local SMF, a resource release request to an AN;

the receiving module 703 is configured to receive, by the terminal, a resource modification request specified by the AN; and the sending module 701 is specifically configured to send, by the terminal, a resource modification response to the AN according to the resource modification request, and release the PDU session according to the resource modification request.

Optionally, the receiving module 703 is specifically configured to receive, by the terminal, a resource modification instruction sent by the base station, wherein the resource modification instruction includes a PDU session modification request, the resource modification instruction is sent according to update information indicated by the SMF that has received update information sent by the UDM, and the update information is used to indicate a mapping relationship between the terminal identification information and the target network slice information to be updated; and the sending module 701 is specifically configured to send, by the terminal, a session modification response to the base station according to the resource modification instruction.

The network slicing apparatus provided in the present application is explained with reference to the accompanying drawings below, and the network slicing apparatus can execute any one of the network slicing methods in FIGS. 8 to 9. For specific implementation and beneficial effects, reference is made to the above descriptions, and details are not described below.

Figure 14:
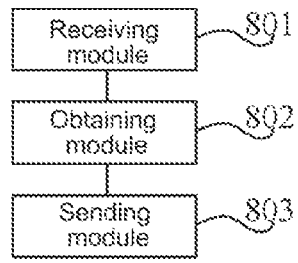
FIG. 14 is a schematic diagram of a structure of a network slicing apparatus according to another embodiment of the present application.

FIG. 14 is a schematic diagram of a structure of a network slicing apparatus according to another embodiment of the present application, and as shown in FIG. 14, the apparatus includes: a receiving module 801, an obtaining module 802, and a sending module 803, wherein:

the receiving module 801 is configured to receive, by a local UDM, a subscription request sent by a local SMF according to a PDU session establishment request initiated by a terminal, wherein the PDU session establishment request includes: initial network slice information, DNN information, terminal identification information, and PDU session identification information, and the subscription request includes: the terminal identification information;

the obtaining module 802 is configured to obtain, by the local UDM, target network slice information corresponding to the terminal identification information according to the terminal identification information; and the sending module 803 is configured to send, by the local UDM, subscription information to the local SMF, wherein the subscription information includes: the target network slice information, so that the local SMF replaces the initial network slice information in the PDU session establishment request with the target network slice information and determines to establish a PDU session.

Optionally, the obtaining module 802 is specifically configured to obtain, in response to an update operation of a mapping relationship between the terminal identification information and the target network slice information, an updated mapping relationship between the terminal identification information and the target network slice information by the local UDM; and the sending module 803 is specifically configured to send, by the local UDM, update information to the local SMF, wherein the update information includes: the updated mapping relationship between the terminal identification information and the target network slice information, so that the local SMF indicates the terminal to perform resource modification according to the update information.

The network slicing apparatus provided in the present application is explained with reference to the accompanying drawings below, and the network slicing apparatus can execute any one of the network slicing methods in FIGS. 10 to 11. For specific implementation and beneficial effects, reference is made to the above descriptions, and details are not described below.

Figure 15:
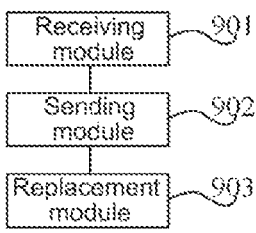
FIG. 15 is a schematic diagram of a structure of a network slicing apparatus according to another embodiment of the present application.

FIG. 15 is a schematic diagram of a structure of a network slicing apparatus according to another embodiment of the present application, and as shown in FIG. 15, the apparatus includes: a receiving module 901, a sending module 902, and a replacement module 903, wherein:

the receiving module 901 is configured to receive, by a local SMF, a PDU session establishment request sent by a terminal, wherein the PDU session establishment request includes: initial network slice information, DNN information, terminal identification information, and PDU session identification information;

the sending module 902 is configured to send, by the local SMF, a subscription request to local UDM according to the PDU session establishment request, wherein the subscription request includes: terminal identification information of the terminal;

the receiving module 901 is specifically configured to receive, by the local SMF, subscription information sent by the local UDM, wherein the subscription information includes target network slice information corresponding to the terminal identification information; and the replacement module 903 is configured to replace, by the local SMF, the initial network slice information in the PDU session establishment request with the target network slice information and determine to establish a PDU session.

The receiving module 901 is specifically configured to receive, by the SMF, update information sent by the UDM, wherein the update information includes: an updated mapping relationship between the terminal identification information and the target network slice information; and the sending module 902 is specifically configured to send the update information to an AMF by the SMF, so that the AMF is configured to send the update information to a base station and send a resource modification instruction to the terminal.

The foregoing apparatus is configured to perform the method according to the aforementioned embodiments, and the implementation principle and technical effect are similar to that of the method and will not be described in detail here.

The above modules may be one or more integrated circuits configured to implement the above methods, for example, one or more Application Specific Integrated Circuits (ASICs), or one or more digital signal processors (DSPs), or one or more Field Programmable Gate Arrays (FPGAs), or the like. For another example, when one of the above modules is implemented in the form of a processing element scheduler code, the processing element may be a general-purpose processor, for example, a Central Processing Unit (CPU) or other processors capable of calling program code. For still another example, these modules may be integrated together and implemented in the form of a system-on-a-chip (SOC).

Figure 16:
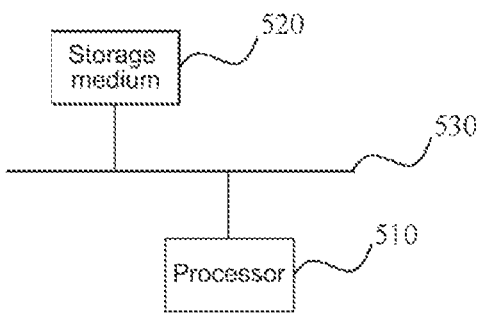
FIG. 16 is a schematic diagram of a structure of a network slicing device according to an embodiment of the present application.

FIG. 16 is a schematic diagram of a structure of a network slicing device according to an embodiment of the present application, wherein the network slicing device may be integrated into a user equipment or a chip of the user equipment.

The network slicing device includes: a processor 510, a storage medium 520, and a bus 530.

The processor 510 is configured to store a program, and the processor 510 calls the program stored in storage medium 520 to execute the method embodiments corresponding to FIGS. 1-11. The specific implementation and technical effect are similar to that of the above description and will not be described in detail here.

Optionally, the present application further provides a program product, for example, a storage medium, wherein the storage medium stores a computer program, including a program, which, when executed by a processor, performs the corresponding embodiments of the foregoing method.

In several embodiments provided in the present application, it should be understood that the disclosed apparatus and method may be implemented in other manners. For example, the described apparatus embodiments are merely illustrative. For example, division into the units is merely logical function division and may be other division in actual implementation. For example, a plurality of units or components may be combined or integrated into another system, or some features may be ignored or not performed. In addition, the displayed or discussed mutual couplings, direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, functional units in embodiments of the present application may be integrated into one processing unit, each of the units may exist alone physically, or two or more units may be integrated into one unit. The integrated unit may be implemented in a form of hardware, or may be implemented in combination of hardware and a software functional unit.

When the integrated unit is implemented in a form of a software functional unit, it may be stored in a computer-readable storage medium. The above software functional unit is stored in a storage medium and includes several instructions for enabling a computer device (which can be a personal computer, a server, a network device or the like) or a processor to implement part of the steps of the method described in the embodiments of the present application. The aforementioned storage medium includes a U-disk, a removable hard disk, a Read-Only Memory (ROM), a Random Access Memory (RAM), a magnetic disk, an optical disk, or other media capable of storing program codes.

The invention claimed is:

1. A network slicing method, comprising:
sending, by a terminal, a target protocol data unit (PDU) session establishment request to a local session management function (SMF), wherein the PDU session establishment request comprises: initial network slice information, data network name (DNN) information, terminal identification information, and PDU session identification information, and wherein a local SMF forwards the PDU session establishment request to the local unified data management UDM so as to request a user subscription, the local UDM obtains, according to the terminal identification information, target network slice information corresponding to the terminal identification information and notifies the local SMF, and then the local SMF replaces the initial network slice information with the target network slice information and determines to establish a PDU session; and receiving, by the terminal, a bearer establishment notification sent by a base station, wherein the bearer establishment notification is determined according to an indication of a local access and mobility management function (AMF) to establish a radio bearer, and the bearer establishment notification is used to indicate the terminal to establish the radio bearer, wherein the local AMF indicates, after the local SMF indicates to confirm establishment of the PDU session, the base station to establish the radio bearer.

2. The method according to claim 1, wherein a mapping relationship of the terminal identification information and the target network slice information is pre-configured within the local UDM.

3. The method according to claim 1, wherein the method further comprises:

sending, by the terminal, a session release request to the local AMF, wherein the session release request is used to indicate the AMF to send, after receiving a session release response sent by the local SMF, a resource release request to an access network (AN);

receiving, by the terminal, a resource modification request specified by the AN; and sending a resource modification response to the AN according to the resource modification request and releasing the PDU session according to the resource modification request by the terminal.

4. The method according to claim 1, wherein the method further comprises:

receiving, by the terminal, a resource modification instruction sent by the base station, wherein the resource modification instruction comprises a PDU session modification request, the resource modification instruction is sent according to update information indicated by the SMF that has received update information sent by the UDM, and the update information is used to indicate the mapping relationship between the terminal identification information and the target network slice information to be updated; and sending, by the terminal, a session modification response to the base station according to the resource modification instruction.

5. A network slicing method, comprising:

receiving, by a local unified data management (UDM), a subscription request sent by a local session management function (SMF) according to a protocol data unit (PDU) session establishment request initiated by a terminal, wherein the PDU session establishment request comprises: initial network slice information, data network name (DNN) information, terminal identification information, and PDU session identification information; and the subscription request comprises: the terminal identification information;

obtaining, by the local UDM, target network slice information corresponding to the terminal identification information according to the terminal identification information; and sending, by the local UDM, subscription information to a local SMF, wherein the subscription information comprises: the target network slice information, so that the local SMF replaces the initial network slice information in the PDU session establishment request with the target network slice information and determines to establish a PDU session.

6. The method according to claim 5, wherein the method further comprises:

the local UDM obtaining, in response to an update operation of a mapping relationship between the terminal identification information and the target network slice information, an updated mapping relationship between the terminal identification information and the target network slice information; and sending, by the local UDM, update information to the local SMF, wherein the update information comprises: the updated mapping relationship between the terminal identification information and the target network slice information, so that the local SMF indicates, according to the update information, the terminal to perform resource modification.

7. A network slicing method, comprising:

receiving, by a local session management function (SMF), a protocol data unit (PDU) session establishment request sent by a terminal, wherein the PDU session establishment request comprises: initial network slice information, data network name (DNN) information, terminal identification information, and PDU session identification information;

sending, by the local SMF, a subscription request to a local unified data management (UDM) according to the PDU session establishment request, wherein the subscription request comprises:

terminal identification information of the terminal;

receiving, by the local SMF, subscription information sent by the local UDM, wherein the subscription information comprises target network slice information corresponding to the terminal identification information; and the local SMF replacing the initial network slice information in the PDU session establishment request with the target network slice information and determining to establish a PDU session.

8. The method according to claim 7, wherein the method further comprises:

receiving, by the SMF, update information sent by the UDM, wherein the update information comprises: an updated mapping relationship between the terminal identification information and the target network slice information; and sending, by the SMF, the update information to a mobile management function AMF, so that the AMF is configured to send the update information to a base station and send a resource modification instruction to the terminal.

* * * * *